Sept. 14, 1965     D. B. SALMON ETAL     3,206,165
VALVE
Filed Aug. 3, 1962     3 Sheets-Sheet 1
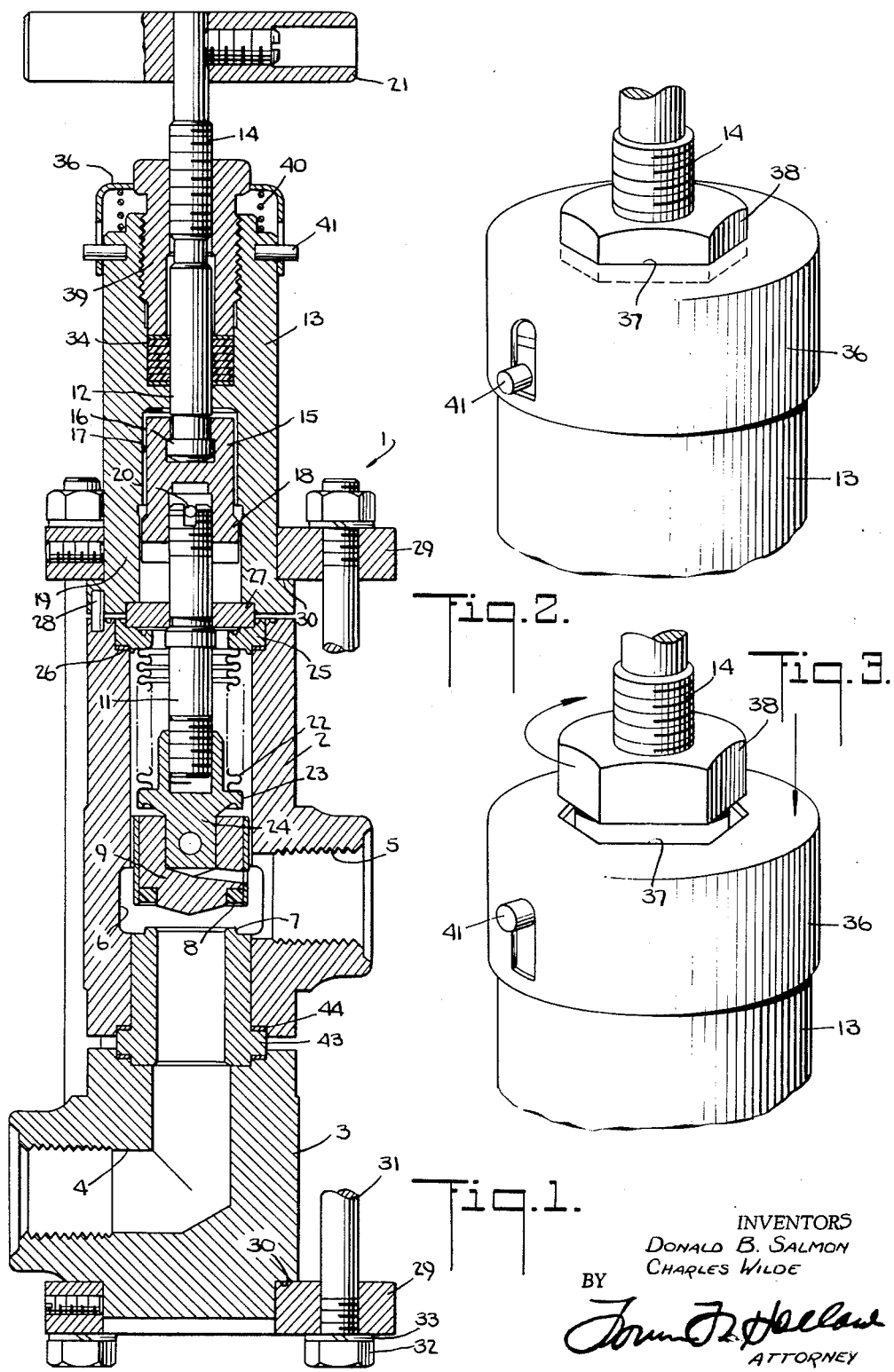
INVENTORS
DONALD B. SALMON
CHARLES WILDE
BY
ATTORNEY Sept. 14, 1965    D. B. SALMON ETAL    3,206,165
VALVE
Filed Aug. 3, 1962    3 Sheets-Sheet 2
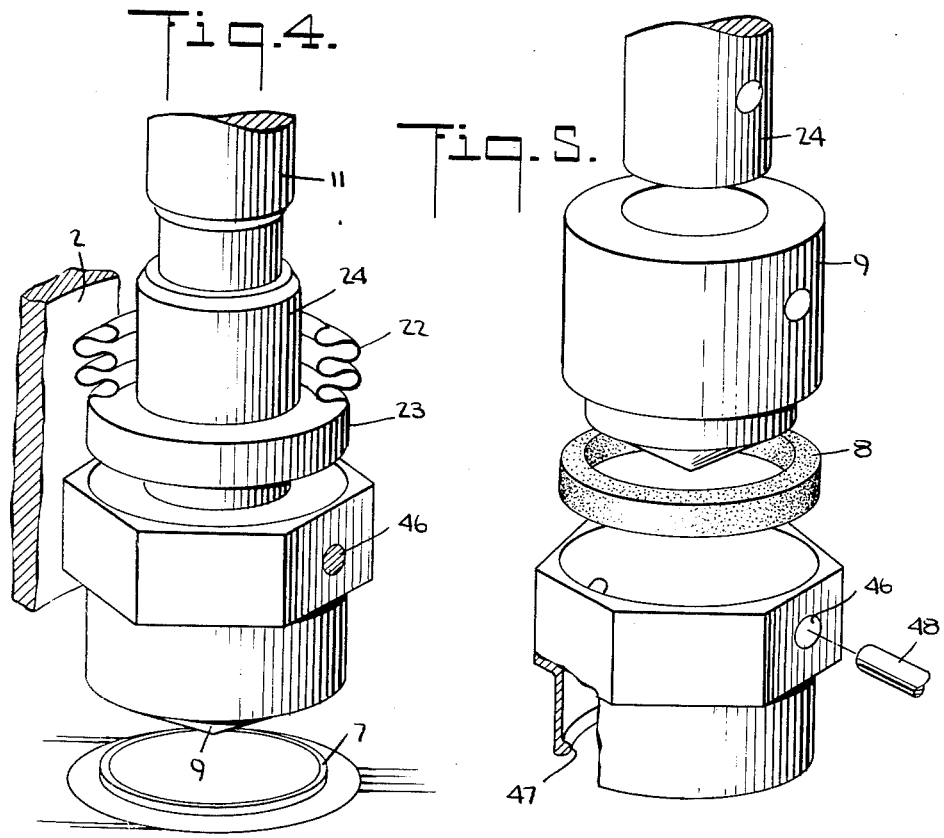
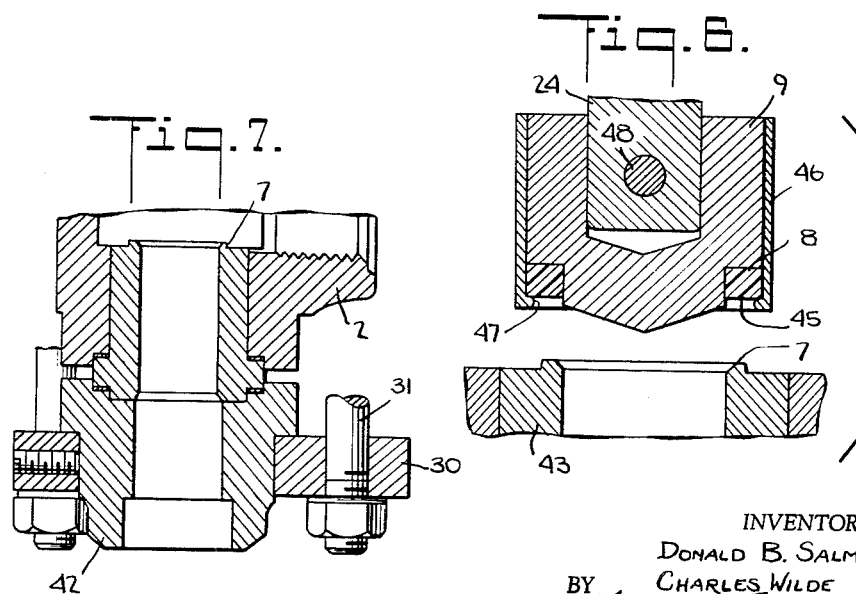
INVENTORS
DONALD B. SALMON
BY  CHARLES WILDE
ATTORNEY Sept. 14, 1965     D. B. SALMON ETAL     3,206,165
VALVE
Filed Aug. 3, 1962     3 Sheets-Sheet 3
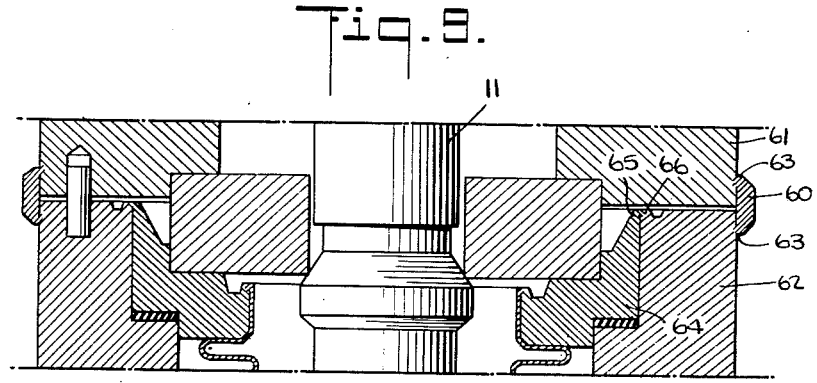
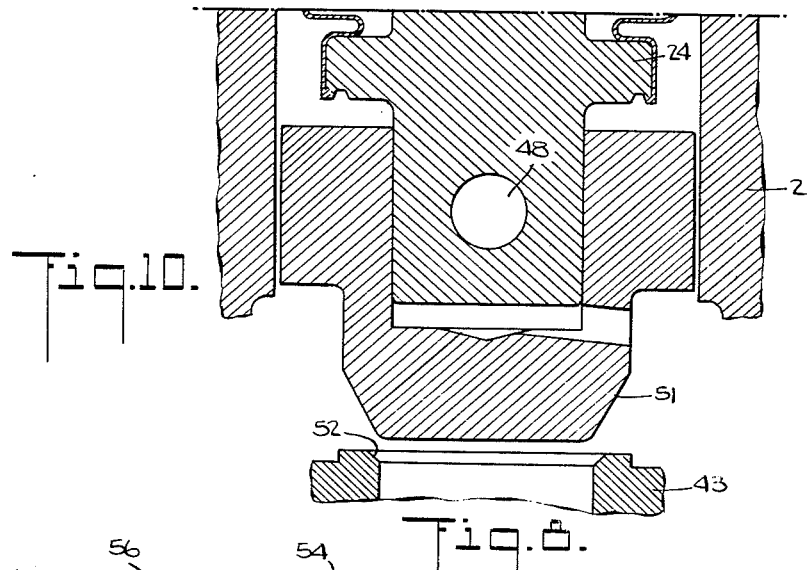
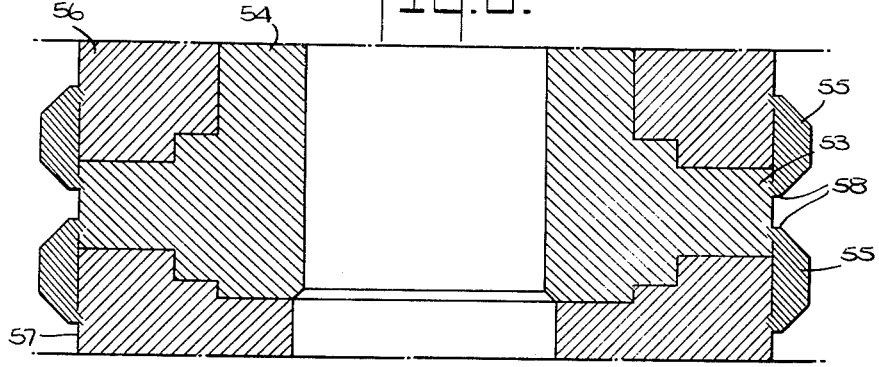
INVENTORS
DONALD B. SALMON
CHARLES WILDE
BY
ATTORNEY United States Patent Office 3,206,165
Patented Sept. 14, 1965

3,206,165
VALVE
Donald B. Salmon, Englewood, and Charles Wilde, Saddle River, N.J., assignors to Hoke Incorporated, Cresskill, N.J., a corporation of New York
Filed Aug. 3, 1962, Ser. No. 214,561
1 Claim. (Cl. 251—335)

The present invention relates to a bellows-type valve and more particularly to a bellows valve particularly adapted for use with corrosive fluids at high pressures and high temperatures.

The increasing use of corrosive fluids in complicated systems where the fluids are handled at extremely high pressure and high temperatures and where the systems must be absolutely fluid tight to prevent leakage of radioactive or other corrosive fluids requires control valves which meet these exacting standards. The widespread use of such systems requires large numbers of such control valves and a supply of moderately priced valves capable of being rapidly produced must be assured to obviate extensive time delay and inordinate expense such as is required by the custom design of such valves. The valve of the present invention is adapted for being produced in large numbers at reasonable cost in a form meeting widely varying design criterion so that even the most exacting temperature, pressure and sealing requirements may be met from a standard stock of valves made according to the invention. The valve of the present invention is also adaptable for a variety of systems or flow control patterns and is so designed that the basic elements are interchangeable to provide a variety of forms while maintaining the high pressure, heat and sealing standards now obtained only in custom designed and custom built fluid control valves.

Accordingly, an object of the present invention is to provide an improved valve.

Another object of the present invention is to provide an improved bellows valve for providing a tight seal at extremely high pressures and temperatures.

Another object of the present invention is to provide an improved valve for controlling corrosive or radioactive fluids.

Another object of the present invention is to provide an improved bellows valve for high temperature and high pressure use which has a long life.

Another object of the present invention is to provide a valve for controlling corrosive or radio-active fluids having high pressures and high temperatures in a wide range of flow control applications.

Another object of the present invention is to provide an improved bellows valve with greatly extended bellows life.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 1 is a vertical sectional view of a preferred embodiment of the valve in accordance with the present invention;

FIGS. 2 and 3 are fragmentary perspective views of the packing gland for the valve stem illustrating the improved packing gland lock;

FIG. 4 is a fragmentary perspective view illustrating the valve seat retainer and bellows construction;

FIG. 5 is an exploded perspective of the valve seat and valve seat retainer;

FIG. 6 is a sectional view of the valve seat;

FIG. 7 is a sectional view of the valve inlet illustrating an alternate inlet shape;

FIG. 8 is a fragmentary sectional view illustrating another embodiment of the lower portion of the valve with a welded seal;

FIG. 9 is a fragmentary sectional view illustrating another embodiment of the valve with a welded bonnet connection; and FIG. 10 is a fragmentary sectional view showing another embodiment of the valve stem.

The valve of the present invention is of the general type known as a bellows valve wherein an impervious mechanical seal is provided between the valve stem and the valve body by connecting the stem to the body through a flexible bellows member. As illustrated in FIG. 1, the preferred embodiment of the valve 1 has a central body outlet portion 2 attached to a body inlet portion 3 so that the two body portions 2 and 3 cooperate to provide a fluid inlet 4 and a fluid outlet 5 which are detachably connected through a cavity 6. Fluid flow from the inlet 4 to the outlet 5 through the cavity 6 is controlled by a cooperating stationary valve seat 7 and a movable valve seat 8 fitted in a seat holder 9. The seat holder 9 moves the movable seat from the open position illustrated in FIG. 1 to a closed position against the adjacent seat 7 by the downward movement of the valve stem formed of a bellows stem 11 and an interconnected upper stem 12 which is threadably connected to a valve bonnet 13 by a threaded portion 14. The upper valve stem 12 and the below stem 11 are connected together by a guide member 15. In order to permit the necessary rotational movement of the upper stem, it is connected to the guide 15 by a pivotal attachment 16. The guide 15 is slidably mounted within the cavity 17 in the bonnet 13 for axial movement, however, it is prevented from rotating by having its lower portion 18 formed with angularly disposed guide surfaces 19 which slidably engage complementarily angularly disposed surfaces in the bonnet 13 to prevent rotational movement of the guide 15 while allowing it to slide axially of the valve bonnet 13. The bellows stem 11 is threadably attached to the guide 15 and locked in position by a suitable pin 20. It thus is clear that rotation of the handle 21 on the top of the upper stem 12 causes the stem 11 to move axially of the bonnet and to move the seat holder 9 and the seat 8 with a corresponding axial movement through the intermediation of the upper guide 15.

In order to prevent fluid leakage past the bellows stem 11 and into the bonnet 13 from the valve body 2, a flexible bellows 22 has one end 23 welded or otherwise attached to a stem base 24 and has its opposite end welded or otherwise suitably attached to a bellows ring 25. When the valve 1 is assembled, the bellows ring 25 is fitted into the upper portion of the bonnet and sealed thereto by a sealing ring or gasket 26. A rigid ring 27 engages both the bellows ring 25 and the bonnet 13 and insures a pressure seal between the bellows ring 25 and the bonnet 13. The inner beveled surface 27a of ring 27 seats on a complementary sealing surface on stem 11 to prevent leakage into the bellows 22 in case the bellows 22 ruptures.

Since the upper guide 15 is held against rotation and is pivotally connected at 16 to the upper stem 12, it is clear that no rotational forces act on the bellows 22 or stem 11 so that the bellows 22 remains unstressed in a rotational sense during valve operation. In addition, a pin 28 is provided to lock the bonnet 13 and the valve body 2 together to prevent relative rotation of the bonnet 13 on the body 2 during valve assembly or thereafter to prevent any rotation of the lower end of the bellows 22 with respect to the bellows ring 25 during valve assembly or during valve use.

FIG. 1 illustrates a preferred means of attaching the valve bonnet 13, the outlet body 2 and the inlet body 3 together. This comprises a pair of clamped plates 29 which engaged spaced shoulder portions 30 on the valve bonnet 13 and the inlet body 3. The plates 30 are urged together to tightly lock the valve members together by two or more tie-rods 31 having suitable nuts 32 and lock washers 33. In the preferred design, the high temperature strength of the valve is insured by choosing a material for the tie-rods which has a lower thermal coefficient of expansion than does the material for the valve body members. This permits the locking forces of the rods and clamps to be retained or even increased at high temperatures and thus insures against valve failure when the valve is used in a high temperature application.

A preferred embodiment of the valve stem packing is illustrated in FIGS. 1–3. The packing includes a plurality of packing washers 34 made of Teflon or another suitable packing material which are compressed and urged against the bonnet 13 and the upper stem 12 by means of a threaded packing gland 39. A preferred gland lock is illustrated comprising a cup-like locking member 36 having an aperture 37 shaped complementarily to the flanged top 38 of the packing nut 39 so that is temporarily locks the nut 39 and holds it against rotation as long as the locking member 36 is held in its upward position by a compressed spring 40 and against a pair of spaced pins 41. When it is desired to adjust the packing pressure, the locking member 36 is forced downwardly against the force of the spring 40 until the top 38 is exposed thereby permitting the nut 39 to be rotated in either direction. This easily manipulated packing adjustment is particularly suited for a bellows valve of the present type which is adapted for use in corrosive systems where the valve must be manipulated by remote control. The above described packing nut adjustment may be performed by remotedly operated members or arms.

As described above, the important and principal elements of the valve are formed in separate pieces and securely but removably fastened together. This not only permits ready replacement for parts, if necessary, but also permits a change in the shape of the inlet and outlet body portions. FIG. 1, for example, illustrates one inlet body portion 3 held in position by the tie-rods 31 where the valve body 2 is aligned generally at right angles to the controlled fluid lines. FIG. 7 illustrates an alternate embodiment with a differently shaped inlet body portion 42 permitting the valve body 2 to extend generally co-axially with the inlet line where such an orientation is desirable or necessary. Other shapes of inlet body portions or outlet body portions may be combined as desired using the above described coupling means and valve structure. The above described coupling also permits the inlet body portions to be rotated with respect to outlet 5 in increments of 90 degrees more or less within the limits of the space between the tie-rods 31.

In high pressure applications for which the present valve is particularly well suited, the resilient portion 8 of the valve seat is subjected to extremely high forces which tend to deform and tear this portion of the valve seat during valve operation and particularly during the final portions of the opening or the closing operation.

A preferred embodiment of a valve seat is illustrated in FIGS. 4–6. The hard or rigid portion of the valve seat 7 preferably comprises a removable insert member 43 fitted into the valve outlet body 2 and held in place by the above described assembly wherein the valve members are held tightly together by the tie-rods 31. Suitable sealing washers 44 are provided to seal the seat portion against leakage.

The resilient valve seat member comprises the resilient ring-like member 8 mounted with an exposed face 45 in the valve seat holder 9. A seat retainer 46 is removably fitted onto the outer surface of the seat holder 9 and the seat retainer 46 has an inwardly directed flange 47 which engages the resilient seat 8 and which cooperates with the seat holder 9 to substantially encapsulate the resilient seat 8 while leaving the lower seating surface 45 exposed and in position to engage the raised sealing lip 7 on the oppositely positioned insert member 43. When thus mounted, a ring formed of Teflon or a similar resilient gasket material has been found to be virtually indestructible over long periods even though exposed to extremely high fluid pressures and as long as the fluid temperatures are below those damaging to the material of the seat. Teflon, for example, may be used for temperatures below about 350° F. to 400° F. The resilient ring 8 may be replaced when necessary by removing the detachably mounted seat retainer 46 from the seat holder 9 as illustrated in FIG. 5 wherein a removable pin 48 is shown which locks the stem base 24, the seat holder 9 and the seat retainer 46 in their assembled position as illustrated in FIG. 4.

As illustrated in FIGS. 4 and 5, the retainer 46 preferably has a hexagonal outer surface which provides a series of vertical corners 50. These corners act as guides to keep the bellows aligned during valve operation by sliding on the inner surface of the body outlet portion 2. In addition, the spaces between the corners 50 permit fluid to flow past the seat holder 9 to prevent entrapment of fluid above the seat holder.

Where high temperature fluids are handled which are injurious to resilient seat materials, a metal plug is used as illustrated in FIG. 10. This high temperature plug is attached to the stem by the pin 48 and it has a tapered lower seating surface 51 which engages the complementary beveled edge 52 on the insert member 43. To lengthen valve life, the tapered surface 51 may be coated with a hard coating such as Stellite or another suitable coating.

While the above described tie-rod connections and sealing washers have proven effective at extremely high pressures and temperatures, an alternate embodiment may be used where extremely hazardous fluids are being controlled. In this embodiment, the separate sections of the valve body are welded or fused together.

As illustrated in FIG. 8, the inlet body portion may be attached to the outlet body portion by the use of welding rings. In this embodiment, the flange portions 53 of the insert member 54 are extended outwardly to the valve body surfaces. A pair of welding rings 55 of suitable material which may be stainless steel are slipped around the valve body portions 56 and 57 with the adjacent edges 58 of the two rings 55 positioned over the flange portion 53 of the insert 54. Heat is applied to these rings and the edges of the rings are melted and fused to the valve body portions. This provides absolute seal while at the same time permitting the valve to be disassembled when necessary. It has been found that a satisfactory weld is formed where the fusing is limited to the edge portion of the rings as shown. It is thus seen that there is no direct fusing between the insert 54 and either the inlet and outlet body portions 56 and 57. The removal of the welding rings by a grinding wheel or other means thus completely frees the valve parts for disassembly.

FIG. 9 illustrates a similar welding ring 60 fastening a bonnet 61 to a body portion 62. Here again, the fusing action occurs at the edges 63 of the ring 60 with no fusing of the bonnet to the outlet body portion directly. This seal may also be removed by grinding off the ring 60.

As also illustrated in FIG. 9, the bellows mounting ring 64 may also be welded to the body portion 62 and this is conveniently done by fusing the upper portions of the adjacent edges 65 of the ring 64 and 66 and the body portion 62. These edges are provided by the tapered surface 67 of the ring 64 and the groove 68 provided in the body portion 62. Here again, this connection may be removed by grinding away the relatively small portions of both the ring 64 and the body portion 62 which are fused together.

It will be seen that an improved bellows type valve has been disclosed which is useful in application where an extremely tightly sealed system is imperative. The valve also is adaptable for use in high temperatures and corrosive systems as its exposed portions are adapted for being formed of metal such as stainless steel or other corrosion resisting materials. In addition to the above important features, the valve is also designed so that it may be easily adapted for a wide variety of systems and it is adapted for use with interchangeable parts and for use with resilient or metal valve seat surfaces. This provides a valve which may be manufactured and stored in quantity without prohibitive expense and which is useful in applications where it is now customary to use only custom engineered and produced valves of extremely high cost and specialized application. The novel bellows mounting takes advantage of the improved sealing and corrosion resisting properties of bellows valve construction while at the same time providing a valve wherein extremely long bellows life is obtained.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

What is claimed is:

In a bellows valve having a detachable bonnet member and body member including a valve seat and a fluid cavity and a valve stem having an upper portion threaded in the bonnet member and having a lower portion flexibly coupled to the side walls of the fluid cavity in the body member by an extensible bellows, the improvement for preventing twisting of the bellows as the stem is turned and the body and bonnet are manipulated during assembly comprising the combination of a swivel joint coupling said stem portions together, guide means slidably and nonrotatably coupling said lower portion of the stem to said bonnet member, means connecting said members together including a key for preventing relative turning of said members and rod means aligned parallel to the valve stem and detachably tying said members together against relative axial and rotational movement, and said rod means having a lower co-efficient of expansion than said members.

References Cited by the Examiner
UNITED STATES PATENTS

| | | | |
|---|---|---|---|
| 552,137 | 12/95 | Nelson | 277—108 |
| 1,295,263 | 2/19 | Blom | 285—187 |
| 1,381,818 | 6/21 | Fulton | 251—335.2 |
| 1,530,505 | 3/25 | Levedahl | 277—111 X |
| 1,667,203 | 4/28 | Harris | 251—214 X |
| 1,835,236 | 12/31 | Miller | 285—286 |
| 2,253,371 | 8/41 | Fisher | 251—274 |
| 2,308,183 | 1/43 | Lewis | 251—335.2 |
| 2,311,009 | 2/43 | Urquhart | 251—357 X |
| 2,369,381 | 2/45 | Unke | 285—286 X |
| 2,485,926 | 10/49 | Saucet | 285—286 |
| 2,507,851 | 5/50 | Bryant | 251—361 X |
| 2,511,109 | 6/50 | Haskell | 277—108 |
| 2,882,007 | 4/59 | Conlan | 251—330 X |
| 2,893,758 | 7/59 | Dufour | 285—268 |
| 3,071,342 | 1/63 | Allen | 251—214 X |

FOREIGN PATENTS

| | | |
|---|---|---|
| 1,153,375 | 9/57 | France. |
| 366,088 | 12/38 | Italy. |

WILLIAM F. O'DEA, *Primary Examiner.*
ISADOR WEIL, *Examiner.*